United States Patent
Belleschi et al.

(10) Patent No.: US 11,777,660 B2
(45) Date of Patent: *Oct. 3, 2023

(54) WIRELESS COMMUNICATION DEVICE, NETWORK NODE AND METHODS FOR HANDLING DATA TRANSMISSIONS

(71) Applicant: Telefonaktiebolaget LM Ericsson (publ), Stockholm (SE)

(72) Inventors: Marco Belleschi, Solna (SE); Björn Nordström, Solna (SE); Ying Sun, Sundbyberg (SE); Riikka Susitaival, Helsinki (FI); Mattias Tan Bergström, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 23 days.

This patent is subject to a terminal disclaimer.

(21) Appl. No.: 17/376,464

(22) Filed: Jul. 15, 2021

(65) Prior Publication Data

US 2021/0376958 A1 Dec. 2, 2021

Related U.S. Application Data

(63) Continuation of application No. 16/937,822, filed on Jul. 24, 2020, now Pat. No. 11,082,163, which is a
(Continued)

(51) Int. Cl.
*H04L 1/1812* (2023.01)
*H04L 1/1829* (2023.01)
(Continued)

(52) U.S. Cl.
CPC .......... *H04L 1/1812* (2013.01); *H04L 1/1864* (2013.01); *H04L 1/1877* (2013.01);
(Continued)

(58) Field of Classification Search
CPC .... H04W 24/08; H04L 5/0055; H04L 1/1887; H04L 1/1877; H04L 1/1864; H04L 1/1812
(Continued)

(56) References Cited

U.S. PATENT DOCUMENTS

| 7,936,731 B2 | 5/2011 | Park et al. |
| 9,780,940 B2 | 10/2017 | Seo et al. |

(Continued)

FOREIGN PATENT DOCUMENTS

| CN | 102301680 A | 12/2011 |
| EP | 2555459 A2 | 2/2013 |

(Continued)

OTHER PUBLICATIONS

NTT DOCOMO, "Views on issues related to LAA UL", 3GPP TSG RAN WG1 Meeting #79, Nov. 17-21, 2014, pp. 1-4, San Francisco, US, R1-144970.

*Primary Examiner* — Peter G Solinsky
(74) *Attorney, Agent, or Firm* — COATS & BENNETT, PLLC

(57) ABSTRACT

Embodiments herein relate to a method implemented by a wireless communication device. The wireless communication device transmits data to a radio node of a wireless communication network. The wireless communication device monitors for a positive acknowledgement or a negative acknowledgement of the data from the radio node. The wireless communication device retransmits the data to the radio node when said monitoring indicates reception of a negative acknowledgement of the data. The wireless communication device refrains from retransmitting the data to the radio node when said monitoring indicates reception of a positive acknowledgement of the data. The wireless communication device also refrains from retransmitting the data to the radio node when said monitoring indicates neither
(Continued)

reception of a positive acknowledgement of the data nor reception of a negative acknowledgement of the data.

24 Claims, 12 Drawing Sheets

Related U.S. Application Data continuation of application No. 15/034,216, filed as application No. PCT/SE2016/050074 on Feb. 1, 2016, now Pat. No. 10,727,984.

(60) Provisional application No. 62/110,033, filed on Jan. 30, 2015.

(51) Int. Cl.
   *H04L 1/1867* (2023.01)
   *H04L 5/00* (2006.01)
   *H04W 24/08* (2009.01)

(52) U.S. Cl.
   CPC .......... *H04L 1/1887* (2013.01); *H04L 5/0055* (2013.01); *H04W 24/08* (2013.01)

(58) Field of Classification Search
   USPC ........................................................ 370/252
   See application file for complete search history.

(56) References Cited

U.S. PATENT DOCUMENTS

| | | | |
|---|---|---|---|
| 10,727,984 | B2 | 7/2020 | Belleschi |
| 11,082,163 | B2 * | 8/2021 | Belleschi .............. H04W 24/08 |
| 2005/0275249 | A1 | 12/2005 | Sailer et al. |
| 2005/0276249 | A1 | 12/2005 | Damnjanovic et al. |
| 2008/0320356 | A1 | 12/2008 | Tokita |
| 2009/0287976 | A1 | 11/2009 | Wang et al. |
| 2010/0191759 | A1 | 7/2010 | Li et al. |
| 2012/0120927 | A1 | 5/2012 | Bucknell |
| 2013/0308464 | A1 | 11/2013 | Park et al. |
| 2013/0336299 | A1 | 12/2013 | Lee et al. |
| 2013/0343336 | A1 | 12/2013 | Bai |
| 2014/0177540 | A1 | 6/2014 | Novak |
| 2014/0177542 | A1 | 6/2014 | Novak et al. |
| 2014/0204893 | A1 | 7/2014 | Horiuchi et al. |
| 2014/0241262 | A1 | 8/2014 | Novak et al. |
| 2014/0293889 | A1 | 10/2014 | Mahr et al. |
| 2014/0341018 | A1 | 11/2014 | Bhushan et al. |
| 2015/0049708 | A1 | 2/2015 | Damnjanovic et al. |
| 2015/0289261 | A1 | 10/2015 | Oizumi et al. |
| 2015/0341921 | A1 | 11/2015 | Chen et al. |
| 2017/0208577 | A1 | 7/2017 | Novak |
| 2017/0215172 | A1 | 7/2017 | Yang et al. |
| 2018/0070313 | A1 | 3/2018 | Papasakellariou et al. |
| 2018/0376479 | A1 | 12/2018 | Kaur et al. |
| 2019/0208540 | A1 | 7/2019 | Kim et al. |
| 2019/0253978 | A1 | 8/2019 | Pelletier |
| 2019/0268109 | A1 | 8/2019 | Wang |

FOREIGN PATENT DOCUMENTS

| | | |
|---|---|---|
| EP | 3001595 A2 | 9/2015 |
| JP | 2009004890 A | 1/2009 |
| JP | 2011519496 A | 7/2011 |
| JP | 2013524614 A | 6/2013 |
| JP | 2014500685 A | 1/2014 |
| JP | 2016072979 A | 5/2016 |
| WO | 2011020922 A1 | 2/2011 |
| WO | 2012078565 A1 | 6/2012 |
| WO | 2014051360 A1 | 4/2014 |
| WO | 2014200951 A2 | 12/2014 |

* cited by examiner

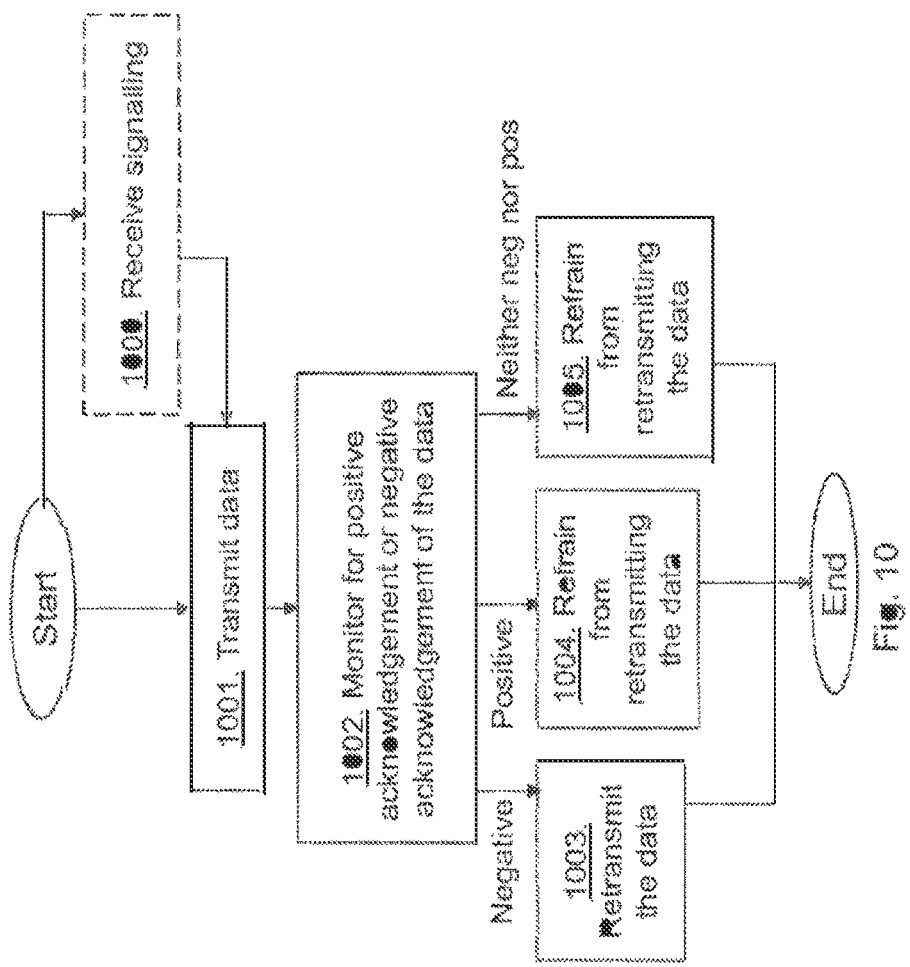

WIRELESS COMMUNICATION DEVICE, NETWORK NODE AND METHODS FOR HANDLING DATA TRANSMISSIONS

RELATED APPLICATIONS

This application is a continuation of prior U.S. application Ser. No. 16/937,822, filed 24 Jul. 2020, which is a continuation of prior U.S. application Ser. No. 15/034,216, filed 4 May 2016, issued as U.S. Pat. No. 10,727,984, which was the National Stage of International Application PCT/SE2016/050074 filed 1 Feb. 2016, which claims the benefit of U.S. Provisional Application No. 62/110,033, filed 30 Jan. 2015, the entire disclosure of each being hereby incorporated by reference herein.

TECHNICAL FIELD

Embodiments herein relate to a wireless communication device, a network node and methods performed by the wireless communication device and the network node in a wireless communication network. In particular, embodiments herein relate to handling data transmissions from wireless communication device to a radio node in the wireless communication network.

BACKGROUND

In a typical communication network, wireless communication devices, also known as wireless devices, mobile stations, stations (STA) and/or user equipments (UE), communicate via a Radio Access Network (RAN) to one or more core networks. The RAN covers a geographical area which is divided into service areas or cell areas, with each service area or cell area being served by a radio node such as a radio access node e.g., a Wi-Fi access point (AP) or a base station (BS), which in some networks may also be denoted, for example, a "NodeB" or "eNodeB". The area or cell area is a geographical area where radio coverage is provided by the radio node. The radio node communicates over an air interface operating on radio frequencies with wireless communication devices within range of the radio node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio nodes may be connected, e.g., by landlines or microwave, to a controller node, such as a radio network controller (RNC) or a base station controller (BSC), which supervises and coordinates various activities of the plural radio nodes connected thereto. This type of connection is sometimes referred to as a backhaul connection. The RNCs are typically connected to one or more core networks.

Specifications for the Evolved Packet System (EPS), also known as Fourth Generation (4G) network, have been completed within the 3GPP and this work continues in the coming 3GPP releases, for example to specify a Fifth Generation (5G) network. The EPS comprises the Evolved Universal Terrestrial Radio Access Network (E-UTRAN), also known as a radio access network of a Long Term Evolution (LTE) network, and the Evolved Packet Core (EPC), also known as System Architecture Evolution (SAE) core network. E-UTRAN/LTE is a 3GPP radio access network wherein the radio nodes are directly connected to the EPC core network rather than to RNCs. In general, in E-UTRAN/LTE the functions of an RNC are distributed between the radio nodes, e.g. eNodeBs in LTE, and the core network. As such, the RAN of an EPS has an essentially "flat" architecture comprising radio nodes connected directly to one or more core networks, i.e. they are not connected to RNCs. To compensate for that, the E-UTRAN specification defines a direct interface between the radio nodes, this interface being denoted the X2 interface.

The ongoing 3GPP Rel-13 study item "Licensed-Assisted Access" (LAA) intends to allow LTE equipment to also operate in the unlicensed 5 GHz radio spectrum. The unlicensed 5 GHz spectrum is used as a complement to the licensed spectrum. Accordingly, wireless communication devices connect in the licensed spectrum, via a primary cell or PCell, and use carrier aggregation to benefit from additional transmission capacity in the unlicensed spectrum, via a secondary cell or SCell. To reduce the changes required for aggregating licensed and unlicensed spectrum, the LTE frame timing in the primary cell is simultaneously used in the secondary cell.

Regulatory requirements, however, may not permit transmissions in the unlicensed spectrum without prior channel sensing. Since the unlicensed spectrum must be shared with other radios of similar or dissimilar wireless technologies, a so called listen-before-talk (LBT) method needs to be applied. LBT involves sensing the medium for a pre-defined minimum amount of time and backing off if the channel is busy. Today, the unlicensed 5 GHz spectrum is mainly used by equipment implementing the IEEE 802.11 Wireless Local Area Network (WLAN) standard. This standard is known under its marketing brand "Wi-Fi."

Due to the LBT procedure, the first slot in which the LAA SCell or LAA UE is permitted to transmit cannot be predicted in advance. This makes it difficult to pre-compute the data payload since several parameters are currently dependent on the slot number in which data is transmitted.

Long Term Evolution (LTE)

LTE uses Orthogonal Frequency-Division Multiplexing (OFDM) in the downlink and Discrete Fourier Transform (DFT)-spread OFDM, also referred to as single-carrier (SC)-Frequency Division Multiple Access (FDMA), in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink subframe and the same number of SC-FDMA symbols in the time domain as number of OFDM symbols in the downlink subframe.

In the time domain, LTE downlink transmissions are organized into radio frames of 10 ms, each radio frame consisting of ten equally-sized subframes of length Tsubframe=1 ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 μs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3.

From LTE Rel-11 onwards, above described resource assignments can also be scheduled on the enhanced Physical Downlink Control Channel (EPDCCH). For Rel-8 to Rel-10 only Physical Downlink Control Channel (PDCCH) is available.

The reference symbols shown in FIG. 3 are the cell specific reference symbols (CRS) that are used to support multiple functions including fine time and frequency synchronization and channel estimation for certain transmission modes.

The generation of the baseband transmit signal on the physical shared channels for either the downlink (DL) or uplink (UL) generally involve scrambling, modulation mapping, layer mapping, precoding, and RE mapping. The specific baseband chain for the UL Physical Uplink Shared Channel (PUSCH) is shown in FIG. 4 as an example. For PUSCH scrambling, the initialization of the scrambling sequence generator at the start of each subframe is a function of the current slot number $n_s$. This is also true for Physical Downlink Shared Channel (PDSCH) scrambling on the DL.

Carrier Aggregation

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 wireless communication device. Each such carrier can be referred to as a Component Carrier (CC). In particular for early LTE Rel-10 deployments it can be expected that there will be a smaller number of LTE Rel-10-capable wireless communication devices compared to many LTE legacy wireless communication devices. Therefore, it is necessary to assure an efficient use of a wide carrier also for legacy wireless communication devices, i.e. that it is possible to implement carriers where legacy wireless communication devices can be scheduled in all parts of the wideband LTE Rel-10 carrier. The straightforward way to obtain this would be by means of Carrier Aggregation (CA). CA implies that an LTE Rel-10 wireless communication device can receive multiple CC, where the CC have, or at least have the possibility to have, the same structure as a Rel-8 carrier. CA is illustrated in FIG. 5. A CA-capable wireless communication device is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case when the number of CCs in downlink and uplink is different. It is important to note that the number of CCs configured in a cell may be different from the number of CCs seen by a wireless communication device: A wireless communication device may for example support more downlink CCs than uplink CCs, even though the cell is configured with the same number of uplink and downlink CCs.

In addition, a key feature of carrier aggregation is the ability to perform cross-carrier scheduling. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a wireless communication device expects to receive scheduling messages on the (E)PDCCH on just one CC—either the same CC, or a different CC via cross-carrier scheduling; this mapping from (E)PDCCH to PDSCH is also configured semi-statically.

Licensed-Assisted Access (LAA) to Unlicensed Spectrum Using LTE

Up to now, the spectrum used by LTE is dedicated to LTE. This has the advantage that LTE system does not need to care about the coexistence issue and the spectrum efficiency can be maximized. However, the spectrum allocated to LTE is limited and cannot meet the ever increasing demand for larger throughput from applications/services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects that the channel is occupied.

Furthermore, one way to utilize the unlicensed spectrum reliably is to transmit essential control signals and channels on a licensed carrier. That is, as shown in FIG. 6, a UE is connected to a PCell in the licensed band and one or more SCells in the unlicensed band. A secondary cell in the unlicensed spectrum is herein denoted as licensed-assisted access secondary cell (LAA SCell).

Hybrid Automatic Repeat Request (HARQ) is a mechanism used in LTE to handle retransmission of missing or erroneous transmitted packets. The HARQ procedure consists in providing feedback, such as Acknowledgement (ACK) and Non-Acknowledgement (NACK), to the transmitter on a transport block basis, thereby offering the possibility to successfully decode a transport block very quickly. The probability to eventually decode with success a given packet is enforced by the soft combining technique that enforces the HARQ operation. In particular, a receiver implementing the soft combining scheme stores the erroneously received packet and later combines it with the retransmitted replicas of that packet requested by the HARQ feedback. Such replicas contain the same data as the original transport block but a different set of coded bits obtained with different redundancy versions, i.e. by using a different puncturing pattern of the code.

In legacy LTE, the uplink HARQ feedback, such as ACK and NACK, is conveyed by a Physical Hybrid-ARQ Indicator Channel (PHICH) that is transmitted by the radio node upon detection of an uplink transmission on the Physical Uplink Shared Channel (PUSCH) from the wireless communication device.

In legacy LTE, the downlink HARQ feedbacks, such as ACK and NACK, are conveyed by the Physical Uplink Control Channel (PUCCH). It is transmitted by the wireless communication device upon detection of a downlink transmission on the Physical Downlink Shared Channel (PDSCH) by the radio node. The wireless communication device determines to retransmit previous data when NACK is received or if no feedback is received.

SUMMARY

An object of embodiments herein is to provide a mechanism that improves the performance of the wireless communication network in a more efficient manner. One or more embodiments herein include methods, apparatus, systems, and computer programs as described in the accompanying claims.

According to an aspect the object is achieved by a method implemented by a wireless communication device. The wireless communication device transmits data to a radio node of a wireless communication network. The wireless communication device also monitors for a positive acknowledgement or a negative acknowledgement of the data from the radio node. When said monitoring indicates reception of a negative acknowledgement of the data, the wireless communication device retransmits the data to the radio node. When said monitoring indicates reception of a positive acknowledgement of the data, the wireless communication device refrains from retransmitting the data to the radio node. When said monitoring indicates neither reception of a positive acknowledgement of the data nor reception of a negative acknowledgement of the data, the wireless communication device also refrains from retransmitting the data to the radio node.

According to another aspect the object is achieved by a method implemented by a network node in a wireless communication network. The network node transmits signaling to a wireless communication device, which signaling indicates that the wireless communication device is to refrain from retransmitting data when the wireless communication device receives neither positive acknowledgement nor negative acknowledgement for that data from a radio node.

According to yet another aspect the object is achieved by providing a wireless communication device configured to transmit data to a radio node of a wireless communication network. The wireless communication device is configured to monitor for a positive acknowledgement or a negative acknowledgement of the data from the radio node. When reception of a negative acknowledgement of the data is indicated in the monitoring, the wireless communication device is configured to retransmit the data to the radio node. When reception of a positive acknowledgement of the data is indicated in the monitoring, the wireless communication device is configured to refrain from retransmitting the data to the radio node. When neither reception of a positive acknowledgement of the data nor reception of a negative acknowledgement of the data is indicated in the monitoring, the wireless communication device is configured to also refrain from retransmitting the data to the radio node.

According to still another aspect the object is achieved by providing a network node for a wireless communication network. The network node is configured to transmit signaling to a wireless communication device, which signaling indicates that the wireless communication device is to refrain from retransmitting data when the wireless communication device receives neither positive acknowledgement nor negative acknowledgement for that data from a radio node.

It is furthermore provided herein a computer program comprising instructions, which, when executed on at least one processor, cause the at least one processor to carry out any of the methods above, as performed by the network node or the wireless communication device. It is additionally provided herein a carrier containing the computer program, wherein the carrier is one of an electronic signal, optical signal, radio signal, or computer readable storage medium.

Thus, according to embodiments herein, the wireless communication device assumes that absence of feedback, e.g. HARQ feedback, is the same thing as that an ACK, e.g. HARQ ACK, has been received. Either all the time or only, according to some embodiments, given that one or more conditions are fulfilled such as only on LAA carriers, given that the network has configured the wireless communication device to do so, etc.

An advantage of this solution is that a wireless communication device will not perform retransmissions which the network has not ordered, hence it is avoided that the wireless communication device performs transmissions which will collide with other transmissions and create interference whereby the performance of the wireless communication network may be improved in a more efficient manner.

BRIEF DESCRIPTION OF THE DRAWINGS

Embodiments will now be described in more detail in relation to the enclosed drawings, in which:

FIG. 10 shows a flowchart depicting a method according to embodiments herein;

DETAILED DESCRIPTION

Figure 1:
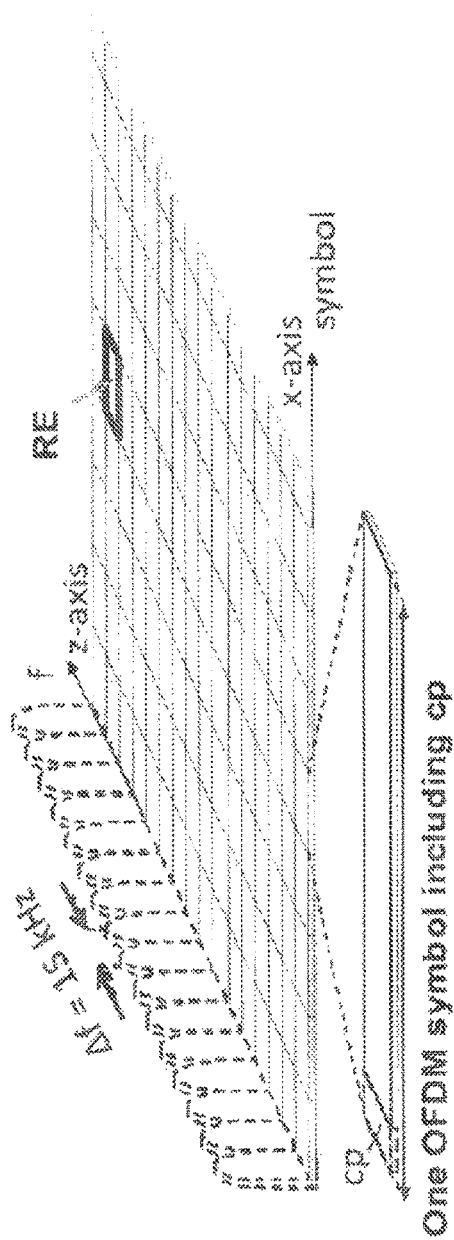
FIG. 1 shows LTE downlink physical resources.
Figure 2:
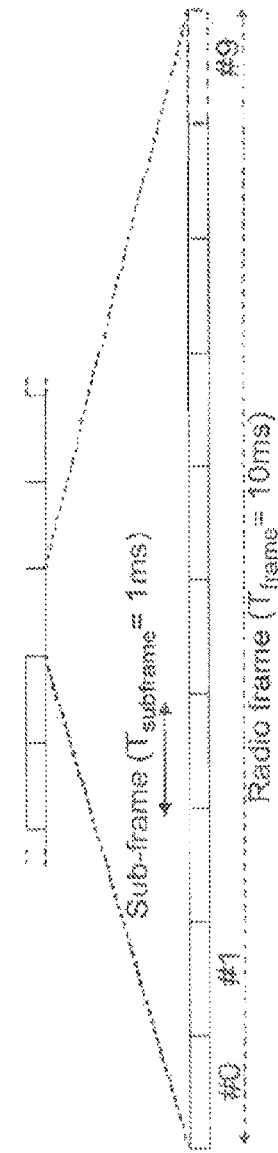
FIG. 2 shows an LTE time domain structure.
Figure 3:
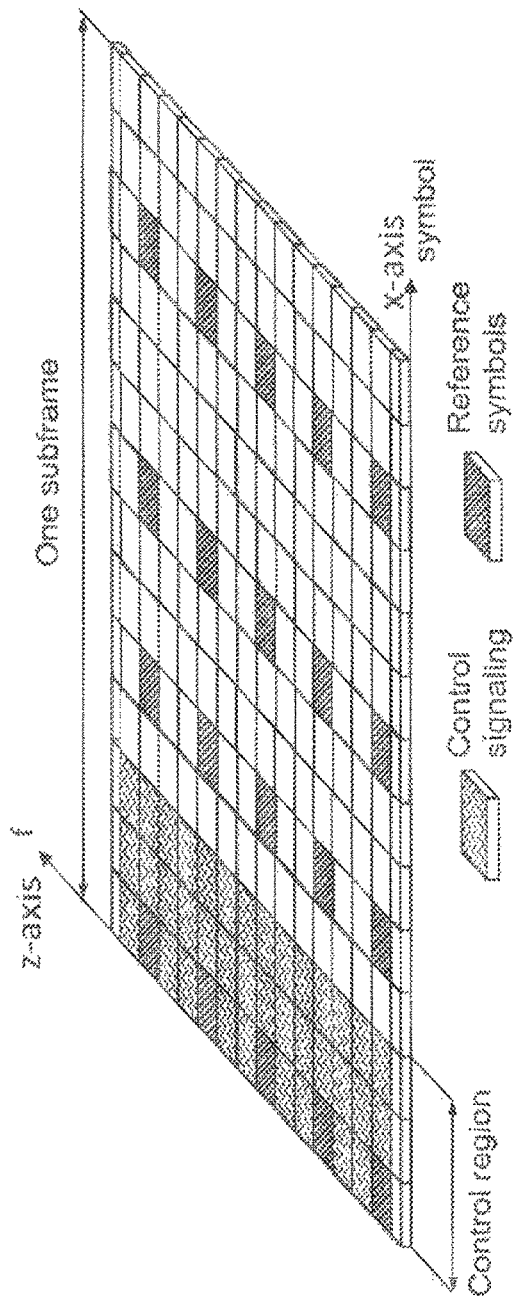
FIG. 3 shows an example of a downlink subframe.
Figures 4, 5:
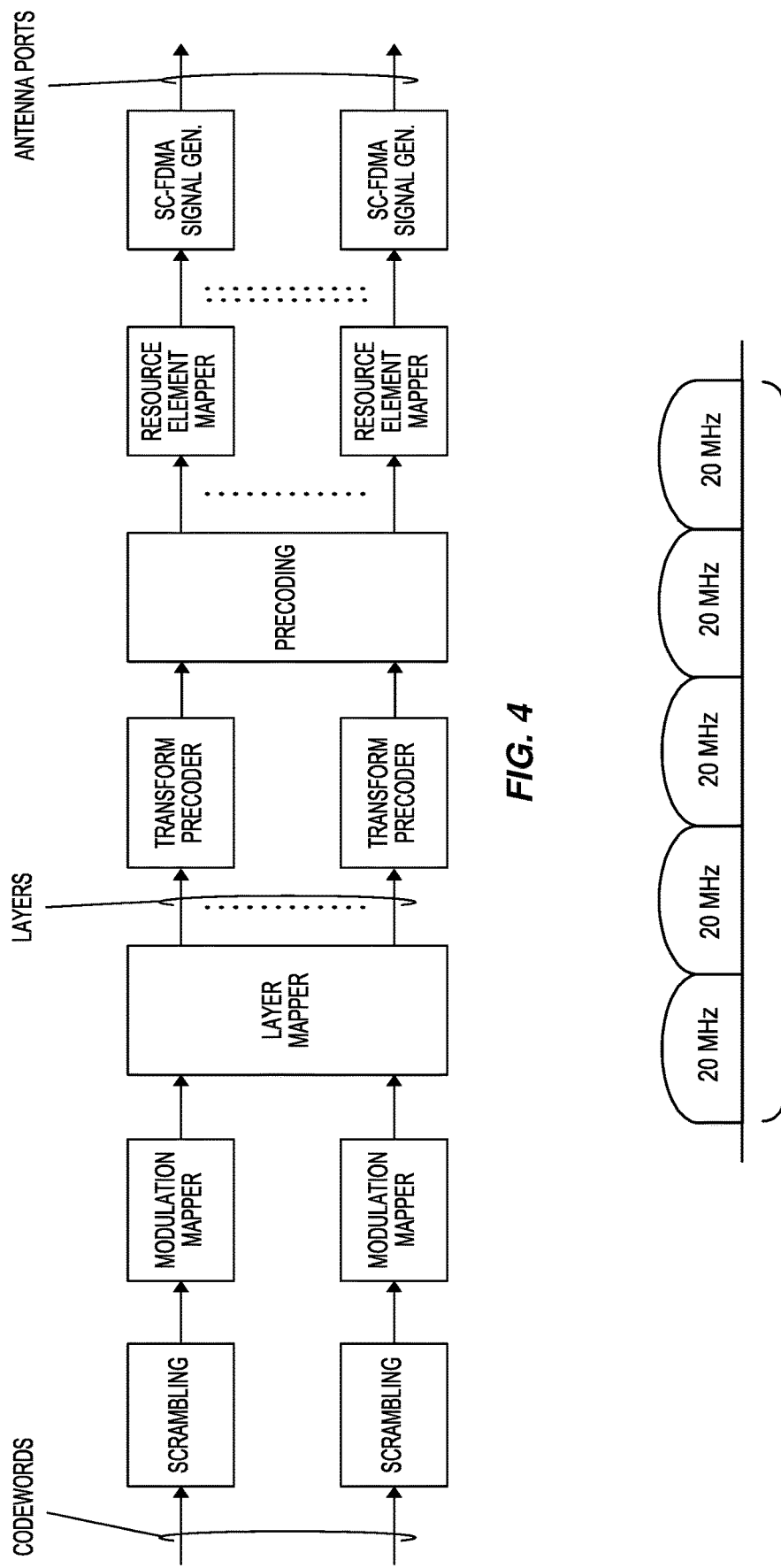
FIG. 4 shows an example of baseband processing for uplink.
FIG. 5 shows carrier aggregation of 100 MHz.
Figure 6:
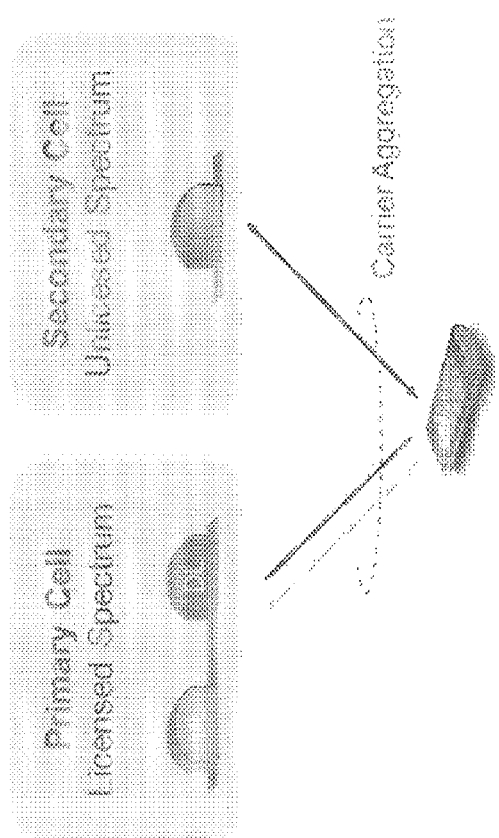
FIG. 6 shows an example of Licensed Assisted Access (LAA) to unlicensed spectrum using LTE carrier aggregation.
Figure 7:
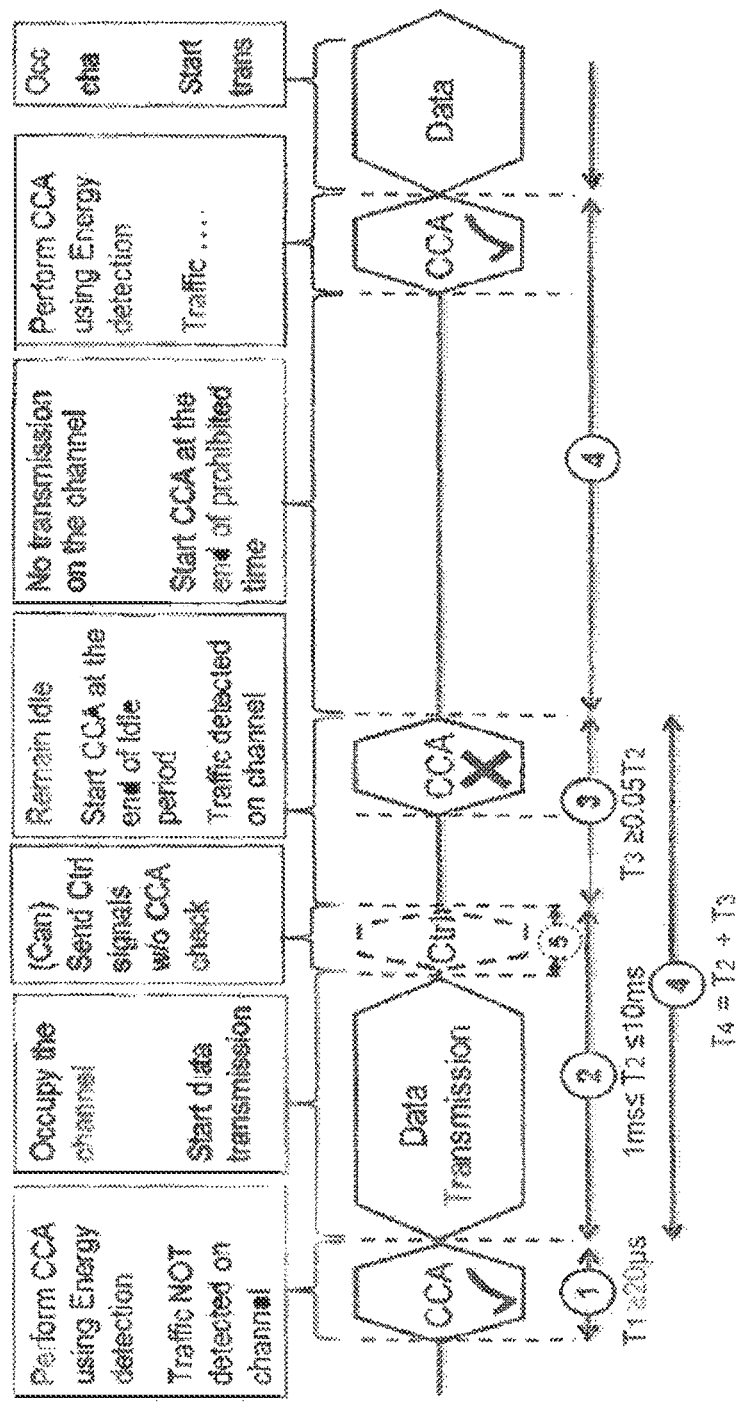
FIG. 7 shows an illustration of a Listen Before Talk process.

Embodiments herein are related to communication in licensed and unlicensed bands, such as LTE, Wireless Local Area Network (WLAN) or similar. In typical deployments of WLANs, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until a later time when the channel is deemed to be Idle. When the range of several Access Points (AP) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. A general illustration of the listen before talk (LBT) mechanism is shown in FIG. 7. Action 1. The transmitter performs a CCA using energy detection. The transmitter detects no traffic on the channel. Action 2. The transmitter occupies the channel and starts data transmission. Furthermore, the transmitter may send Control (Ctrl) signals without (w/o) CCA check denoted as action 5. Action 3. The transmitter remains idle and starts a CCA in the end of the idle period. Traffic is detected on the channel and the channel is busy. Action 4. Thus, no transmission is allowed on the channel as the channel is busy and in the end of the prohibited time the transmitter starts a CCA using energy detection. The transmitter detects no traffic on the channel and the transmitter occupies the channel and starts data transmission.

To operate in e.g. unlicensed bands one needs to obey certain rules. One such rule is that a transmitter, such as a radio node or a wireless communication device, needs to listen on the carrier before starting to transmit. If the medium is free the transmitter can transmit while if the medium is busy, e.g. some other node is transmitting, the transmitter needs to suppress the transmission and the transmitter can try again at a later time. This is referred to as Listen Before Talk (LBT).

Due to LBT a transmission in an unlicensed band may be delayed until a later time when the medium is free. And in case there is no coordination between the transmitting nodes, which often is the case, the delay may appear random.

Unlike current LTE procedures, in LAA both uplink and downlink scheduled transmissions in any physical channels can be aborted before the scheduled transmission actually occurs. For example, the Listen Before Talk (LBT) entails the sensing of the wireless medium by the transmitter in order to detect the presence of other nodes in the surroundings that are currently transmitting and that can potentially disturb. If the medium was identified as busy by the LBT procedure, the transmission is aborted.

In current LTE systems, if an HARQ feedback on PHICH is aborted by the radio node due to busy channel, detected in e.g. an LBT procedure, the wireless communication device will interpret the expected feedback as absent or "discontinuous transmission (DTX)" since no transmission was actually detected over the air. According to current LTE operation if ACK is not detected, the wireless communication device will consider that a NACK has been received and act accordingly. This means that in case of DTX, i.e. no ACK detected, the wireless communication device considers that it has received an NACK. Thus, the wireless communication device will proceed with retransmitting the transport block at subframe 12, as shown in FIG. 8.

As part of developing embodiments herein a problem has been identified. The problem with the aforementioned behavior is that if the radio node intended to send an ACK, it is likely that physical resources (PRB) which the wireless communication device will use for the retransmission has been reallocated by the radio node to some other wireless communication device that will also transmit at subframe 12, thus creating interference in the subframe.

Figure 8:
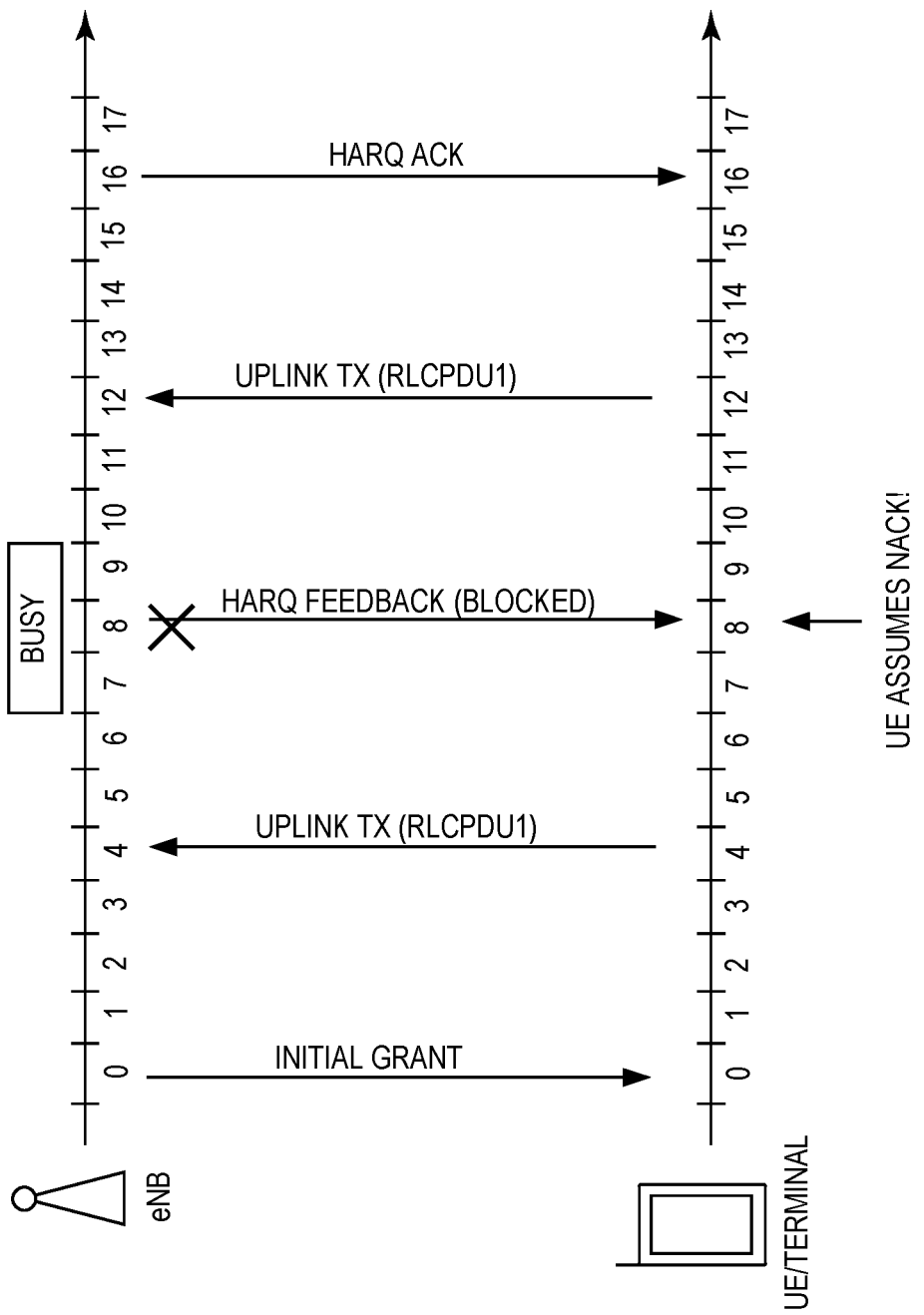
FIG. 8 shows current behavior of a wireless communication device according to prior art.

While the wireless communication device may already today, without LAA, miss to receive HARQ feedback, the frequency in missing HARQ feedback would be much higher in case of LAA due to the LBT mechanism, see FIG. 8. Hence it is even more harmful in unlicensed bands, i.e. on LAA carriers. In fact, PHICH in LTE undergoes relatively robust channel coding, e.g. Binary Phase Shift Keying (BPSK) modulation is used, that should prevent from frequent DTX, and also ACK/NACK misinterpretation, at the wireless communication device side. Instead, when the PHICH is transmitted over the unlicensed spectrum, the probability that LBT identifies the transmission medium as busy, thus inducing the PHICH transmission to be aborted, can be relatively high especially in case many (or highly loaded) systems and nodes are using the same spectrum.

Figure 9A:
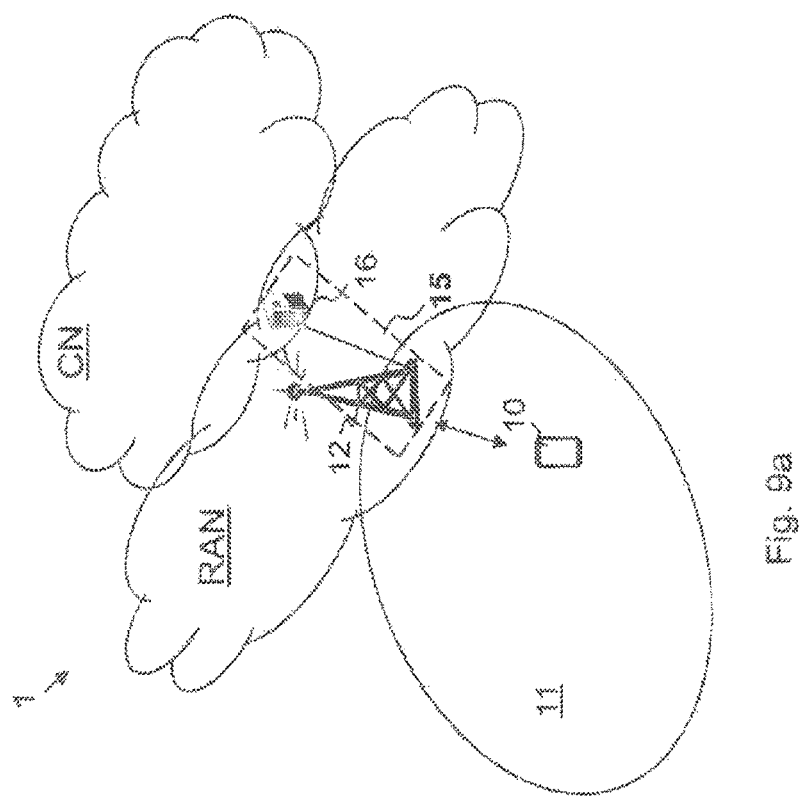
FIG. 9a shows a schematic overview depicting a wireless communication network according to embodiments herein.

Embodiments herein relate to communication networks in general. FIG. 9a is a schematic overview depicting a wireless communication network 1. The wireless communication network 1 comprises one or more RANs and one or more CNs. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations.

In the wireless communication network 1, wireless devices e.g. a wireless communication device 10 such as a mobile station, a non-access point (non-AP) STA, a STA, a user equipment and/or a wireless terminal, communicate via one or more Access Networks (AN), e.g. RAN, to one or more core networks (CN). It should be understood by those skilled in the art that "wireless communication device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablet or even a base station communicating with wireless communication devices within a cell.

The wireless communication network 1 comprises a radio node 12 providing radio coverage over a geographical area, a first service area 11, according to a first radio access technology (RAT), such as LTE, Wi-Fi or similar. The radio node 12 may be a radio access network node such as an access point e.g. a WLAN access point or an Access Point Station (AP STA), a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless communication device within the service area served by the radio node 12 depending e.g. on the first radio access technology and terminology used. The wireless communication network 1 further comprises a controller node 16 such as an access controller or radio network controller, base station controller or similar. The radio node 12 and the controller node 16 are defined as a network node 15 herein. Embodiments herein relate to behavior of the wireless communication device 10 in case absence of feedback, e.g. HARQ feedback.

Figure 9B:
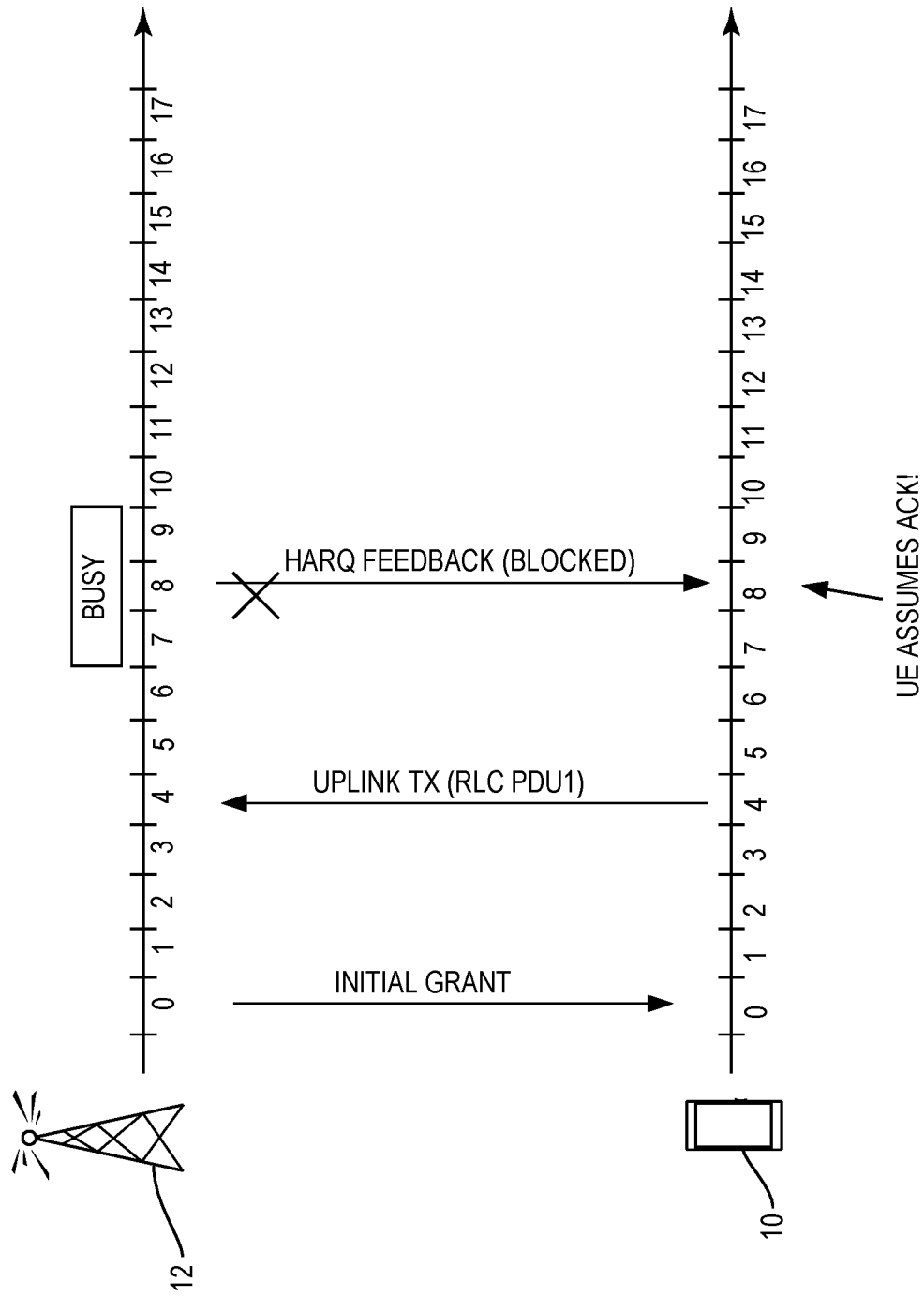
FIG. 9b shows a signaling scheme according to embodiments herein.

In embodiments herein the wireless communication device 10 will consider absence of HARQ feedback as ACK, i.e. if the wireless communication device 10 does not detect any HARQ feedback the wireless communication device 10 interprets this situation as if the wireless communication device 10 has received an ACK for that HARQ procedure or data transmission. This is exemplified in FIG. 9b. In subframe 0, the radio node 12 transmits an initial grant. The wireless communication device 10 receives the grant and transmits an UL transmission (TX) e.g. Radio Link Control Protocol Data Unit (RLC PDU) in subframe 4 as granted. The radio node 12 receives the UL transmission but the channel is busy, sensed by e.g. a LBT procedure, and the radio node 12 is not allowed to transmit on the channel, i.e. the HARQ feedback is blocked. In this situation, the wireless communication device 10 is according to embodiments herein configured to assume that absence of HARQ feedback is considered as an ACK.

When the wireless communication device 10 considers that it has received an ACK, the wireless communication device 10 may suspend the associated HARQ procedure and refrain from sending any retransmissions. This can be seen when comparing FIG. 9b with FIG. 8; in FIG. 9b the wireless communication device 10 will not perform a retransmission while in FIG. 8 the wireless communication device 10 performs retransmission. The wireless communication device 10 will not resume the HARQ process until that it has received an NACK from the network or received a grant for uplink transmissions.

If the wireless communication device 10 considers the absence of HARQ feedback as ACK, the following two scenarios may occur:

The radio node 12 intended to send an ACK but the transmission with the ACK was aborted due to busy medium. In this case, the wireless communication device 10 will wait for further instruction from network, NACK or a new transmission grant.

The radio node 12 intended to send a NACK but the transmission with the NACK was aborted due to busy medium. In this case, the radio node 12 wanted the wireless communication device 10 to perform a retransmission, but since the radio node 12 aborted the NACK transmission, the radio node 12 will at a later time send the NACK and/or a PDCCH command with a new data indicator (NDI) not toggled and redundancy version indicator (RVI) stepped to indicate to the wireless communication device 10 a different puncturing pattern.

The method actions performed by the wireless communication device 10 according to some embodiments will now be described with reference to a flowchart depicted in FIG. 10. The actions do not have to be taken in the order stated below, but may be taken in any suitable order. Actions performed in some embodiments, but not necessarily in all embodiments, are marked with dashed boxes.

Action 1000.

The wireless communication device 10 may receive signaling from the network node 15, e.g. the radio node 12 or the core network node 16, indicating that the wireless communication device 10 is to refrain from retransmitting data when neither positive acknowledgement nor negative acknowledgement is received for that data. The data may in one example be data transmitted by the wireless communication device 10 to the radio node 12. The network node 15 may configure the wireless communication device 10 to apply one behavior on non-LAA carriers or licensed carriers but another behavior for LAA carriers or unlicensed carriers. The behavior on an LAA carrier may for example be to refrain from retransmitting the data when neither positive acknowledgement nor negative acknowledgement is received for the transmission of that data on the LAA carrier to the radio node 12, whereas the behavior on a non-LAA carrier may in this example be to retransmit the data when neither positive acknowledgement nor negative acknowledgement is received for the transmission of that data on the non-LAA carrier to the radio node 12.

Action 1001.

The wireless communication device 10 transmits data to the radio node 12 of the wireless communication network 1. The wireless communication device 10 may transmit the data to the radio node over unlicensed spectrum or over an asynchronous protocol. The wireless communication device 10 may be configured to perform a Listen Before Talk procedure before transmitting data to the radio node 12. Hence, the wireless communication device 10 may listen on a carrier to determine that the carrier is free for transmission before transmitting data on the carrier.

Action 1002.

The wireless communication device 10 monitors for a positive acknowledgement or a negative acknowledgement of the data from the radio node 12. The positive acknowledgement may be an ACK or a PDCCH command with a new data indicator (NDI) toggled and the negative acknowledgement may be a NACK or a PDCCH command with a new data indicator (NDI) not toggled. The PDCCH command may comprise an UL grant. In this way whether the wireless device 10 should retransmit or not may be controlled by ACK/NACK or UL grant on PDCCH indicating positive acknowledgement or negative acknowledgement, i.e. if NDI flag is toggled in PDCCH new data will be transmitted, whereas if it is not toggled retransmission will happen. Toggle means that a "switch" indicates a new transmission. So if the network previously indicated 1 but then indicates 0, that means that the network has "toggled" the indicator and the wireless communication device shall perform a new transmission. If the network then indicates 0 again that means that the wireless communication device shall perform a retransmission. The wireless communication device will keep on retransmitting until that the network toggles to 1 upon which the wireless communication device will perform a new transmission. The positive or negative acknowledgement of the data may in some embodiments be conveyed on a Physical Hybrid Automatic Repeat reQuest Indicator Channel (PHICH). For example, the positive or negative acknowledgement of the data may in some embodiments be received by the wireless communication device 10 on the PHICH as a result of the monitoring. In other embodiments it may be conveyed on the Physical Downlink Control Channel (PDCCH), e.g. in form of a PDCCH command or an UL grant as explained above. For example, the positive or negative acknowledgement of the data may then be received by the wireless communication device 10 on the PDCCH as a result of the monitoring.

The radio node 12 may be configured to perform a Listen Before Talk (LBT) procedure when a carrier, upon which the positive acknowledgement or the negative acknowledgement is to be transmitted, must be occupied by the radio node 12 before transmitting said positive acknowledgement or said negative acknowledgement of the transmitted data to the wireless communication device 10. When the LBT procedure identifies the transmission medium, i.e. a carrier upon which the positive acknowledgement or the negative acknowledgement is to be transmitted, as busy, the transmission of the positive acknowledgement or the negative acknowledgement may be aborted, as described above.

Action 1003.

The wireless communication device 10 retransmits the data to the radio node 12 when said monitoring indicates reception of a negative acknowledgement of the data. The wireless communication device 10 may in some embodiments retransmit the data a certain maximum number of retransmissions before the wireless communication device 10 considers it failed and hence would not perform any more retransmissions.

Action 1004.

The wireless communication device 10 refrains from retransmitting the data to the radio node 12 when said monitoring indicates reception of a positive acknowledgement of the data. As stated above the wireless communication device 10 may receive an ACK or a PDCCH with NDI toggled indicating that previous HARQ loop was successful and new data can be transmitted.

Action 1005.

In addition to the refraining of Action 1004, the wireless communication device 10 secondly, further, additionally, refrains from retransmitting the data to the radio node 12 when said monitoring indicates neither reception of a positive acknowledgement of the data nor reception of a negative acknowledgement of the data. In this additional refraining action, the wireless communication device may additionally refrain from retransmitting the data to the radio node 12 when said monitoring indicates neither reception of a positive acknowledgement of the data nor reception of a negative acknowledgement of the data until reception of a negative acknowledgement of the data or reception of a grant for transmitting different data. In other words, the additional refraining from retransmitting the data said monitoring indicates neither reception of a positive acknowledgement of the data nor reception of a negative acknowledgement of the data to the radio node 12 may be performed until a negative acknowledgement of the data or a grant for transmitting different data is received by the wireless communication device 10. The negative acknowledgement may comprise a NACK or a grant for retransmission, i.e. an UL grant where the NDI-flag has not been toggled. The wireless communication device may additionally refrain from retransmitting the data to the radio node 12 when said monitoring indicates neither reception of a positive acknowledgement of the data nor reception of a negative acknowledgement of the data when one or more conditions are met. Stated differently, the additional refraining from retransmitting the data to the radio node 12 may be performed when said monitoring indicates neither reception of a positive acknowledgement of the data nor reception of a negative acknowledgement of the data and, in addition, one or more conditions are met.

For example, the one or more conditions may be one or more of the following: whether or not the data was transmitted over unlicensed spectrum e.g. whether or not LBT is applied on a specific carrier or on any carrier; whether or not the data was transmitted over a first type of radio access; whether the data was transmitted over a first type of radio access or over a second type of access, the second type of access being different from the first type of access; whether the data is of a first type or a second type, e.g. the first type of data may have a lower quality of service (QoS) classification or be less delay sensitive than the second type of data.

The one or more conditions may in example embodiments be met, such that the refraining of Action 1005 is performed, when the data was transmitted over unlicensed spectrum. Alternatively or additionally, the one or more conditions may be met, such that the refraining of Action 1005 is performed, when the data was transmitted over a first type of radio access, whereas the one or more conditions are not met when the data was transmitted over the second type of radio access, such that the refraining of Action 1005 is not performed, meaning that when the data was transmitted over the second type of radio access and the monitoring indicates neither reception of a positive acknowledgement of the data nor reception of a negative acknowledgement of the data, retransmission of the data is made. Furthermore, in addition or alternatively, the one or more conditions may be met, such that the refraining of Action 1005 is performed, when the data is of the first type, whereas the one or more conditions are not met when the data is of the second type, such that the refraining from retransmitting the data to the radio node 12 of Action 1005 is not performed when the data is of the second type different than the first type. The second type of data may thus be retransmitted to the radio node 12 when said monitoring indicates neither reception of a positive acknowledgement of the data nor reception of a negative acknowledgement of the data. The data of the second type is different than data of the first type. Thus, the network node 15 may configure the wireless communication device 10 for which QoS classes the wireless communication device 10 should additionally refrain from retransmitting the data when neither reception of a positive acknowledgement of the data nor reception of a negative acknowledgement of the data is indicated in said monitoring.

The wireless communication device 10 may perform the additional refraining from retransmitting the data to the radio node 12 of Action 1005 when said monitoring indicates neither reception of a positive acknowledgement of the data nor reception of a negative acknowledgement of the data in accordance with the received signaling in Action 1000.

As stated above, in some embodiments, the wireless communication device 10 may interpret absence of HARQ feedback as ACK or NACK depending on whether one or more conditions are met. Some further illustrations on example conditions are provided below.

Condition on Carrier Type

In one embodiment the wireless communication device 10 may apply a condition on which carrier type the HARQ feedback was expected to be received on.

One possibility is that the wireless communication device 10 applies a first behavior with regards to how to handle absence of HARQ feedback when operating an LAA carrier, or other type of carrier carried on unlicensed spectrum, and applies a second behavior with regards to how to handle absence of HARQ feedback when operating other carriers, e.g. non-LAA carriers.

The first behavior with regards to how to handle absence of HARQ feedback can be that the wireless communication device 10 considers absence of HARQ feedback as ACK. The second behavior could be that the wireless communication device 10 considers absence of HARQ feedback as NACK and retransmits the data. It could also be so that the second wireless communication device behavior is undefined. The first behavior thus corresponds to the refraining described in Action 1005 above.

The benefit of this embodiment is that in legacy spectrum it might still be desired to interpret DTX, i.e. absence of HARQ feedback, as NACK since this procedure is more aggressive in terms of how quickly the wireless communication device 10 will retransmit the data and avoids the inherent delay induced by considering absence of HARQ feedback as ACK. In fact, if the radio node 12 had scheduled a NACK on PHICH, the wireless communication device 10 can retransmit without waiting for further commands via PDCCH by the network. This might be convenient especially for delay-sensitive traffic.

On the other hand, the unlicensed spectrum is already in its nature affected by unpredictable sources of interference thus it is important to prevent any additional disturbance/interference that the legacy approach, i.e. interpreting absence of HARQ feedback as NACK, would imply. Moreover, the unlicensed band is not typically configured by the operator to carry delay-sensitive information thus the suggested procedure is not expected to harm the unlicensed spectrum traffic.

Condition on Traffic Type

In yet another embodiment, the wireless communication device 10 considers the absence of HARQ feedback as ACK or NACK on the basis of the type of traffic that is setup. Such decision can be for instance taken on the basis of the Quality Class Indicator (QCI) associated with the traffic. If a traffic is delay-sensitive, e.g. real time gaming, Voice over IP (VoIP) calls etc. then NACK is assumed in case of absence of HARQ feedback. Otherwise, for other type of bearers, e.g. File Transfer Protocol (FTP) applications, ACK is assumed in case of absence of HARQ feedback.

Figure 11:
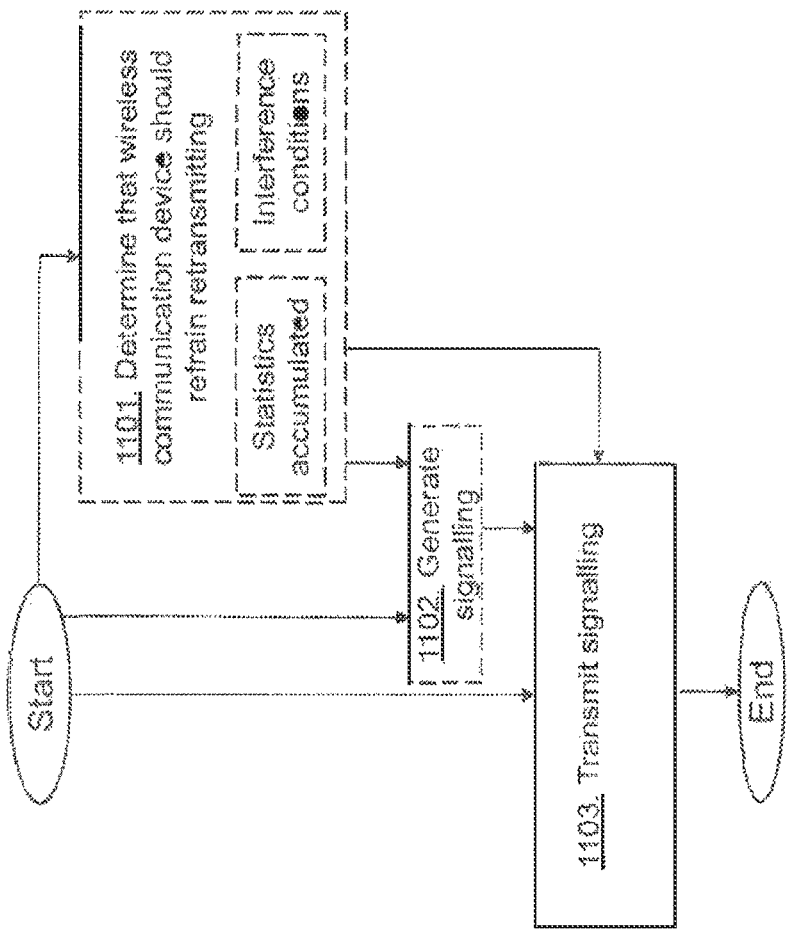
FIG. 11 shows a flowchart depicting a method according to embodiments herein.

The method actions implemented by the network node 15, such as the radio node 12 or the core network node 16, in the wireless communication network 1 according to some embodiments will now be described with reference to a flowchart depicted in FIG. 11. The actions do not have to be taken in the order stated below, but may be taken in any suitable order. Actions performed in some embodiments, but not necessarily in all embodiments, are marked with dashed boxes. The network node 15, e.g., when implemented as the radio node 12, may be configured to perform an LBT procedure before transmitting data and/or feedback to the wireless communication device 10. FIG. 11 relates to the signaling mentioned above in Action 1000 above where the wireless communication device 10 receives the signaling from the network node 15.

Action 1101.

The network node 15 may determine that the wireless communication device 10 is to refrain from retransmitting data when the wireless communication device receives neither positive acknowledgement nor negative acknowledgement for the transmission of that data. The data may be data transmitted by the wireless device 10 to the radio node 12 in the wireless communication network 1. The determination may be performed by the network node 15 based on statistics accumulated within the wireless communication network 1, e.g. by the network node 15. The determination may be performed by the network node 15 based on interference conditions at the wireless communication device 10, the network node 15, and/or the radio node 12 to which the wireless communication device 10 transmits the data. The positive or negative acknowledgement of the data may in some embodiments be conveyed on a Physical Hybrid Automatic Repeat Request Indicator Channel (PHICH). In other embodiments it may be conveyed on the Physical Downlink Control Channel (PDCCH), e.g. in form of a PDCCH command or an UL grant as explained above.

Action 1102.

The network node 15 may generate signaling that indicates that the wireless communication device 10 is to refrain from retransmitting data when the wireless communication device 10 receives neither positive acknowledgement nor negative acknowledgement for that data. The feedback, i.e. the positive acknowledgement or negative acknowledgement for the data may be expected by the wireless communication device 10 from the radio node 12, to which the data was transmitted.

Action 1103.

The network node 15 transmits the signaling generated in Action 1102 to the wireless communication device 10, which signaling indicates that the wireless communication device 10 is to refrain from retransmitting data when the wireless communication device 10 receives neither positive acknowledgement nor negative acknowledgement for that data. The feedback, i.e. the positive acknowledgement or negative acknowledgement for the data may be expected by the wireless communication device 10 from the radio node 12.

The transmitting of Action 1103 may in some embodiments be performed by one node, e.g. the radio node 12, while the determination of Action 1101 is performed by another node in the wireless communication network 1, e.g. core network node 16 or another radio node than the radio node 12. For example, in e.g. Dual Connectivity and/or Carrier Aggregation the wireless communication device 10 may be connected to several radio nodes, i.e. there may be one radio node configuring the wireless communication device 10 and hence do the determining of Action 1101 and another radio node which makes the transmission of action 1103 and possibly performs an LBT procedure. It is also possible that the generating of Action 1102 is performed by another node than the node performing the transmission of Action 1103. For example, the generating of Action 1102 may be performed by the core network node 16 while the transmission of Action 1103 is performed by the radio node 12.

Condition on Network Indication

As stated above, whether the wireless communication device 10 interprets absence of HARQ feedback as NACK or ACK may be configured by the network node 15. The network node 15, such as a radio node 12, may configure the wireless communication device 10 by using e.g. Radio Resource Control (RRC) signaling, Medium Access Control (MAC) signaling, or some other type of indication.

This may allow the network node 15 to adjust the wireless communication device behavior based on the preference of the network. For example, if the network wants that the wireless communication device 10 to quickly perform a retransmission the network node 15 may configure the wireless communication device 10 to interpret absence of HARQ feedback as NACK, which triggers a retransmission. And if the network wants the wireless communication device 10 to avoid performing unexpected retransmissions the network node 15 may configure the wireless communication device 10 to interpret absence of HARQ feedback as ACK.

Moreover, the decision by the network, e.g. by the network node 15 may also be taken on some statics accumulated by e.g. the radio node 12 over the time, e.g. in case of lack of stronger interferers in the surrounding, the radio node 12 may prefer to adopt the solution in which absence of HARQ feedbacks is interpreted by the wireless communication device 10 as ACK. However this solution would imply sending such decision via RRC signaling.

Apparatus

With the above modifications and variations in mind, a wireless communication device is configured, e.g., via functional means or units, to implement any processing described above.

Figure 12:
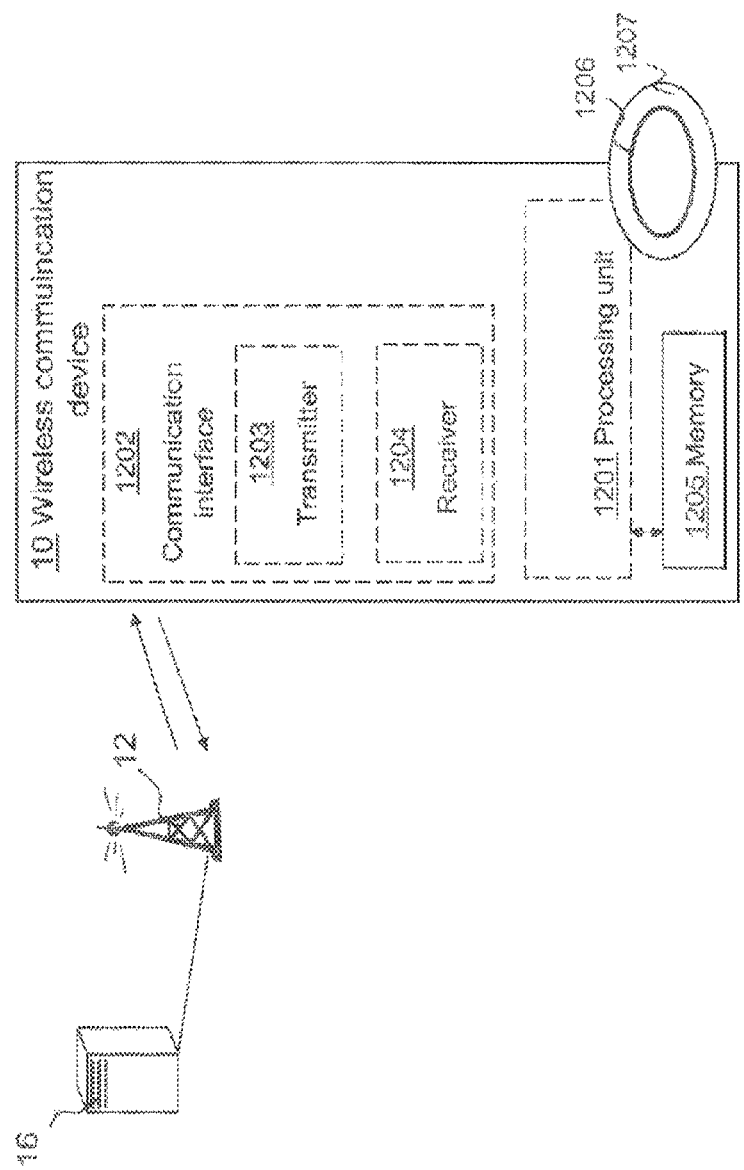
FIG. 12 shows a block diagram depicting a wireless communication device according to embodiments herein.

FIG. 12 is a block diagram depicting the wireless communication device 10. The wireless communication device 10 may comprise processing circuit 1201 and communication interface 1202 with a transmitter 1203 and a receiver 1204.

The wireless communication device 10, the processing circuit 1201, the communication interface 1202 and/or the transmitter 1203 may be configured to transmit data to the radio node 12 of the wireless communication network 1.

The wireless communication device 10, and/or the processing circuit 1201, may be configured to monitor for a positive acknowledgement or a negative acknowledgement of the data from the radio node 12.

The wireless communication device 10, the processing circuit 1201, the communication interface 1202 and/or the transmitter 1203 may be configured to, when reception of a negative acknowledgement of the data is indicated in the monitoring, retransmit the data to the radio node 12.

The wireless communication device 10, the processing circuit 1201, the communication interface 1202 and/or the transmitter 1203 may be configured to, when reception of a positive acknowledgement of the data is indicated in the monitoring, refrain from retransmitting the data to the radio node 12.

The wireless communication device 10, the processing circuit 1201, the communication interface 1202 and/or the transmitter 1203 may be configured to, when neither reception of a positive acknowledgement of the data nor reception of a negative acknowledgement of the data is indicated in the monitoring, additionally refrain from retransmitting the data to the radio node 12.

The wireless communication device 10, the processing circuit 1201, the communication interface 1202 and/or the transmitter 1203 may be configured to transmit the data to the radio node 12 over unlicensed spectrum or over an asynchronous protocol.

The wireless communication device 10, the processing circuit 1201, the communication interface 1202 and/or the transmitter 1203 may be configured to, when the monitoring indicates neither reception of a positive acknowledgement of the data nor reception of a negative acknowledgement of the data, additionally refrain from retransmitting the data to the radio node 12 until reception of a negative acknowledgement of the data or reception of a grant for transmitting different data at the wireless communication device 10. In other words, when neither reception of a positive acknowledgement of the data nor reception of a negative acknowledgement of the data is indicated as a result of the monitoring, the wireless communication device 10, the processing circuit 1201, the communication interface 1202 and/or the transmitter 1203 may be configured to refrain from retransmitting the data to the radio node 12 until a negative acknowledgement of the data or a grant for transmitting different data is received at the wireless communication device 10.

The wireless communication device 10, the processing circuit 1201, the communication interface 1202 and/or the transmitter 1203 may be configured to, when the monitoring indicates neither reception of a positive acknowledgement of the data nor reception of a negative acknowledgement of the data, additionally refrain from retransmitting the data to the radio node 12 when one or more conditions are met.

The wireless communication device 10, the processing circuit 1201, the communication interface 1202 and/or the transmitter 1203 may be configured to, when the monitoring indicates neither reception of a positive acknowledgement of the data nor reception of a negative acknowledgement of the data, additionally refrain from retransmitting the data to the radio node 12 when the data was transmitted over unlicensed spectrum.

The wireless communication device 10, the processing circuit 1201, the communication interface 1202 and/or the transmitter 1203 may be configured to, when the monitoring indicates neither reception of a positive acknowledgement of the data nor reception of a negative acknowledgement of the data, additionally refrain from retransmitting the data to the radio node 12 when the data was transmitted over a first type of radio access.

The wireless communication device 10, the processing circuit 1201, the communication interface 1202 and/or the transmitter 1203 may be configured to, when the monitoring indicates neither reception of a positive acknowledgement of the data nor reception of a negative acknowledgement of the data, additionally refrain from retransmitting the data to the radio node 12 when the data is of a first type. The first type of data may be of a lower quality of service classification or may be less delay sensitive than a second type of data and the wireless communication device 10, the processing circuit 1201, the communication interface 1202 and/or the transmitter 1203 may be configured not to refrain from retransmitting the data to the radio node 12 when the data is of the second type different than the first type. In other words, the wireless communication device 10, the processing circuit 1201, the communication interface 1202 and/or the transmitter 1203 may when the data is of the second type be configured to retransmit the data to the radio node 12.

The wireless communication device 10, the processing circuit 1201, the communication interface 1202 and/or the transmitter 1203 may be configured to receive signaling from the network node 15, which may in some embodiments be the radio node 12, in other embodiments e.g. the core network node 16 or another radio node, indicating that the wireless communication device is to refrain from retransmitting data when neither positive acknowledgement nor negative acknowledgement is received for the transmission of that data to the radio node 12. The wireless communication device 10, the processing circuit 1201, the communication interface 1202 and/or the transmitter 1203 may further be configured to, when the monitoring indicates neither reception of a positive acknowledgement of the data nor reception of a negative acknowledgement of the data, additionally refrain from retransmitting the data to the radio node 12 in accordance with the received signaling.

The radio node 12 may be configured to perform a Listen Before Talk procedure before transmitting data to the wireless communication device 10. For example, the radio node 12 may be configured to perform the Listen Before Talk procedure when a carrier upon which the positive acknowledgement or the negative acknowledgement is to be transmitted must be occupied by the radio node 12 before transmitting said positive acknowledgement or said negative acknowledgement of the transmitted data to the wireless communication device 10. The positive or negative acknowledgement of the data may in some embodiments be conveyed by the PHICH. In other embodiments it may be conveyed on the Physical Downlink Control Channel (PDCCH), e.g. in form of a PDCCH command or an UL grant as explained above.

In at least some embodiments, the wireless communication device 10 comprises one or more processing circuits configured to implement the above processing, such as by implementing functional means or units. In one embodiment, for example, the processing circuit(s) implement functional means or units as respective circuits. The circuits in this regard may comprise circuits dedicated to performing certain functional processing and/or one or more microprocessors in conjunction with a memory 1205. In embodiments that employ memory, which may comprise one or several types of memory such as read-only memory (ROM), random-access memory, cache memory, flash memory devices, optical storage devices, etc., the memory stores program code that, when executed by the one or more processing circuits dedicated to performing certain functional processing and/or one or more microprocessors, carries out the techniques described herein.

In one or more embodiments, the wireless communication device 10 also comprises one or more communication interfaces. The one or more communication interfaces include various components for sending and receiving data and control signals. More particularly, the interface(s) include the transmitter 1203 that is configured to use known signal processing techniques, typically according to one or more standards, and is configured to condition a signal for transmission (e.g., over the air via one or more antennas). Similarly, the interface(s) include the receiver 1204 that is configured to convert signals received (e.g., via the antenna(s)) into digital samples for processing by the one or more processing circuits.

Also, a network node is configured, e.g., via functional means or units, to implement any processing described above.

Figure 13:
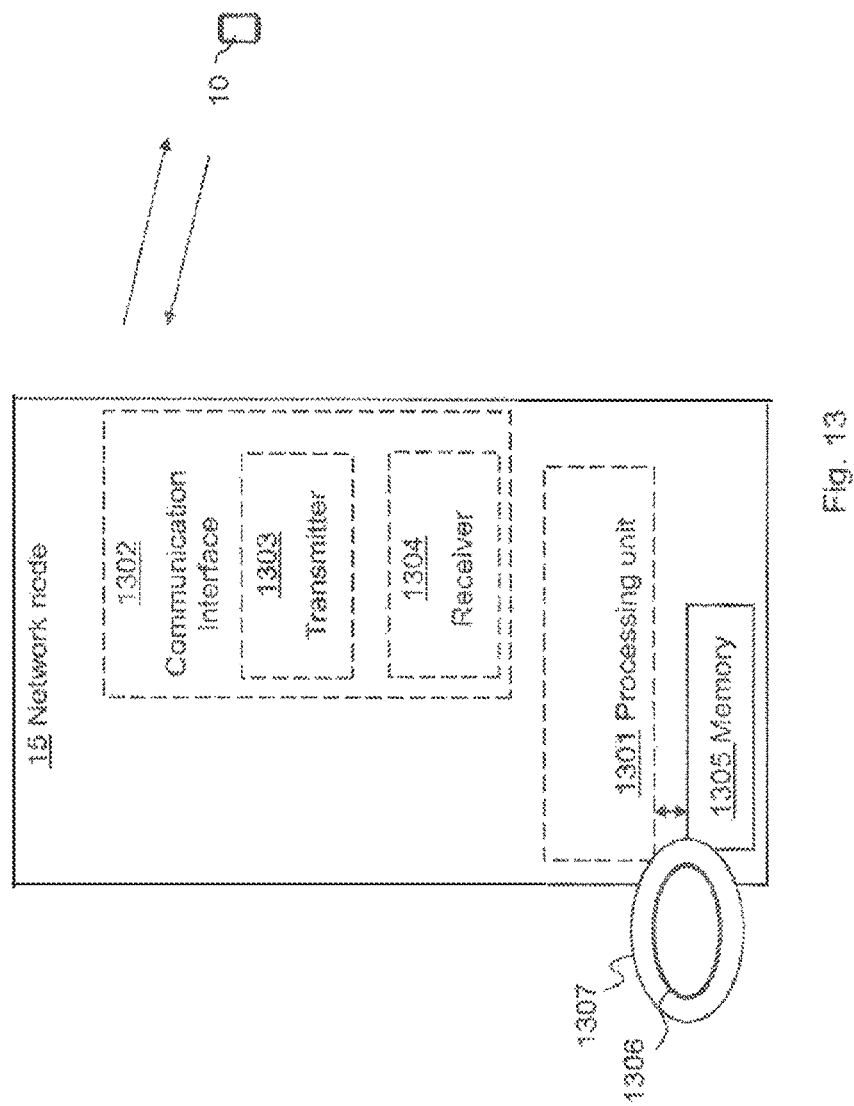
FIG. 13 shows a block diagram depicting a network node according to embodiments herein.

FIG. 13 is a block diagram depicting the network node 15 in the wireless communication network 1. The network node 15 may comprise processing circuit 1301 and a communication interface 1302 with a transmitter 1303 and a receiver 1304.

The network node 15, the processing circuit 1301, the communication interface 1302 and/or the transmitter 1303 may be configured to transmit signaling to the wireless communication device 10, which signaling indicates that the wireless communication device is to refrain from retransmitting data when the wireless communication device 10 receives neither positive acknowledgement nor negative acknowledgement for that data from a radio node 12.

The network node 15 and/or the processing circuit 1301 may be configured to generate the signaling that indicates that the wireless communication device 10 is to refrain from retransmitting data when the wireless communication device 10 receives neither positive acknowledgement nor negative acknowledgement for that data from the radio node 12.

The network node 15 may be the radio node 12 and the radio node 12 may be configured to perform a Listen Before Talk procedure before transmitting data to the wireless communication device 10. For example, the radio node 12 may be configured to perform the Listen Before Talk procedure when a carrier upon which the positive acknowledgement or the negative acknowledgement is to be transmitted must be occupied by the radio node 12 before transmitting said positive acknowledgement or said negative acknowledgement of the data to the wireless communication device 10.

The network node 15 and/or the processing circuit 1301 may be configured to determine that the wireless communication device 10 is to refrain from retransmitting data when the wireless communication device receives neither positive acknowledgement nor negative acknowledgement for the transmission of that data to the radio node 12.

The network node 15 and/or the processing circuit 1301 may be configured to perform said determination based on statistics accumulated within the wireless communication network 1.

The network node 15 and/or the processing circuit 1301 may further be configured to perform said determination based on interference conditions at the wireless communication device, the network node, and/or the radio node to which the wireless communication device 10 transmits the data.

The positive or negative acknowledgement of the data may in some embodiments be conveyed on a Physical Hybrid Automatic Repeat Request Indicator Channel. In other embodiments it may be conveyed on the Physical Downlink Control Channel (PDCCH), e.g. in form of a PDCCH command or an UL grant as explained above.

In at least some embodiments, the network node 15 comprises one or more processing circuits configured to implement the above processing, such as by implementing functional means or units. In one embodiment, for example, the processing circuit(s) implement functional means or units as respective circuits. The circuits in this regard may comprise circuits dedicated to performing certain functional processing and/or one or more microprocessors in conjunction with a memory 1305. In embodiments that employ memory, which may comprise one or several types of memory such as read-only memory (ROM), random-access memory, cache memory, flash memory devices, optical storage devices, etc., the memory stores program code that, when executed by the one or more processing circuits dedicated to performing certain functional processing and/or one or more microprocessors, carries out the techniques described herein.

In one or more embodiments, the network node 15 also comprises one or more communication interfaces. The one or more communication interfaces include various components (not shown) for sending and receiving data and control signals. More particularly, the interface(s) include the transmitter 1303 that is configured to use known signal processing techniques, typically according to one or more standards, and is configured to condition a signal for transmission (e.g., over the air via one or more antennas). Similarly, the interface(s) include the receiver 1304 that is configured to convert signals received (e.g., via the antenna(s)) into digital samples for processing by the one or more processing circuits.

Computer Program Embodiments

Those skilled in the art will also appreciate that embodiments herein further include corresponding computer programs.

A computer program 1206, 1306 comprises instructions which, when executed on at least one processor of the network node 15 or the wireless communication device 10, cause node or device to carry out any of the respective processing described above. Embodiments further include a carrier containing such a computer program. This carrier may comprise one of an electronic signal, optical signal, radio signal, or computer readable storage medium 1207, 1307, such as a disc or similar.

A computer program in this regard may comprise one or more code modules corresponding to the means or units described above.

Terminology

In some embodiments the non-limiting term user equipment (UE) is used and it refers to any type of wireless device communicating with a radio network node in a cellular or mobile communication system. Examples of wireless communication devices or UE are target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles etc.

In some embodiments the non-limiting term radio network node or simply network node 15 is used and it refers to any type of network node serving UE and/or connected to other network node or network element or any radio node from where UE receives signal. Examples of radio network nodes are Node B, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

As will be readily understood by those familiar with communications design, functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

What is claimed is:

1. A method, implemented by a wireless communication device, comprising:
   receiving Radio Resource Control (RRC) signaling indicating that Hybrid Automatic Repeat Request (HARQ) information for data transmissions by the wireless communication device is conveyed on a Physical Downlink Control Channel (PDCCH);
   transmitting data over an asynchronous protocol on an uplink carrier to a radio node of a wireless communication network;
   monitoring the PDCCH for HARQ information conveyed by a New Data Indicator (NDI) flag of a transmission from the radio node, the NDI flag supporting two states, wherein a first of the two states indicates, by the NDI flag not being toggled, that the transmission comprises an uplink grant for retransmission of the data, and a second of the two states indicates, by the NDI flag being toggled, that the transmission comprises an uplink grant for new data;
   receiving the transmission on the PDCCH in response to the monitoring; and
   transmitting the new data or retransmitting the data based on whether or not the NDI flag is toggled, respectively, wherein the transmitting or retransmitting is to the radio node.

2. The method of claim 1, wherein the transmitting comprises transmitting the data to the radio node over unlicensed spectrum.

3. The method of claim 1, wherein the monitoring of the PDCCH is performed responsive to the data being transmitted over unlicensed spectrum.

4. The method of claim 1, wherein the monitoring of the PDCCH is performed responsive to the data being transmitted over a particular type of radio access out of a plurality of different types of radio access supported by the wireless communication device.

5. The method of claim 1, wherein the monitoring of the PDCCH is performed responsive to the data being of a first type and not of a second type different than the first type, wherein the first type of data has a lower quality of service classification and/or is less delay sensitive than the second type of data.

6. The method of claim 1, wherein receiving the transmission on the PDCCH comprises receiving the transmission on a carrier:
   that is required to be occupied by the radio node before the radio node is permitted to use the carrier for the transmission; and
   after the radio node has used a Listen Before Talk procedure to occupy the carrier.

7. A method, implemented by a network node in a wireless communication network, the method comprising:
   transmitting Radio Resource Control (RRC) signaling to a wireless communication device, which RRC signaling indicates that Hybrid Automatic Repeat Request (HARQ) information for a data transmission by the wireless communication device to a radio node is conveyed on a Physical Downlink Control Channel (PDCCH);
   wherein the HARQ information is conveyed by a New Data Indicator (NDI) flag of a transmission from the radio node, the NDI flag supporting two states;
   wherein a first of the two states indicates, by the NDI flag not being toggled, that the transmission from the radio node comprises an uplink grant for retransmission of data, and a second of the two states indicates, by the NDI flag being toggled, that the transmission from the radio node comprises an uplink grant for new data.

8. The method of claim 7, further comprising generating the RRC signaling that indicates that the HARQ information for the data transmission by the wireless communication device is conveyed on the PDCCH.

9. The method of claim 7, wherein a radio node to which the wireless communication device transmits the data is configured to perform a Listen Before Talk procedure when a carrier upon which the transmission from the radio node is to be transmitted must be occupied by the radio node before the transmission to the wireless communication device.

10. The method of claim 7, further comprising determining that HARQ information for the data transmission by the wireless communication device is to be conveyed on a PDCCH.

11. The method of claim 10, wherein the determining comprises performing the determination based on statistics accumulated within the wireless communication network.

12. The method of claim 10, wherein the determining comprises performing the determination based on interference conditions at the wireless communication device, the network node, and/or the radio node to which the wireless communication device transmits the data.

13. A wireless communication device, comprising:
a processor;
memory comprising instructions executable by the processor whereby the wireless communications device is configured to:
receive Radio Resource Control (RRC) signaling indicating that Hybrid Automatic Repeat Request (HARQ) information for data transmissions by the wireless communication device is conveyed on a Physical Downlink Control Channel (PDCCH);
transmit data over an asynchronous protocol on an uplink carrier to a radio node of a wireless communication network;
monitor the PDCCH for HARQ information conveyed by a New Data Indicator (NDI) flag of a transmission from a radio node, the NDI flag supporting two states, wherein a first of the two states indicates, by the NDI flag not being toggled, that the transmission comprises an uplink grant for retransmission of the data, and a second of the two states indicates, by the NDI flag being toggled, that the transmission comprises an uplink grant for new data;
receive the transmission on the PDCCH in response to the monitoring; and
transmit the new data or retransmit the data based on whether or not the NDI flag is toggled, respectively, wherein the transmitting or retransmitting is to the radio node.

14. The wireless communication device of claim 13, wherein the instructions are such that the wireless communication device is further configured to transmit the data to the radio node over unlicensed spectrum.

15. The wireless communication device of claim 13, wherein the instructions are such that the wireless communication device is configured to monitor the PDCCH responsive to the data being transmitted over unlicensed spectrum.

16. The wireless communication device of claim 13, wherein the instructions are such that the wireless communication device is configured to monitor the PDCCH responsive to the data being transmitted over a particular type of radio access out of a plurality of different types of radio access supported by the wireless communication device.

17. The wireless communication device of claim 13, wherein the instructions are such that the wireless communication device is configured to monitor the PDCCH responsive to the data being of a first type and not of a second type different than the first type, wherein the first type of data has a lower quality of service classification and/or is less delay sensitive than the second type of data.

18. The wireless communication device of claim 13, wherein the instructions are such that the wireless communication device is configured to receive the transmission on a carrier:

that is required to be occupied by the radio node before the radio node is permitted to use the carrier for the transmission; and
after the radio node has used a Listen Before Talk procedure to occupy the carrier.

19. A network node for a wireless communication network, comprising:
a processor circuit;
a transmitter operatively connected to the processor circuit and configured to transmit Radio Resource Control (RRC) signaling to a wireless communication device, wherein:
the RRC signaling indicates that Hybrid Automatic Repeat Request (HARQ) information for a data transmission by the wireless communication device is conveyed on a Physical Downlink Control Channel (PDCCH);
the HARQ information is conveyed by a New Data Indicator (NDI) flag of a transmission from a radio node, the NDI flag supporting two states;
a first of the two states indicates, by the NDI flag not being toggled, that the transmission from the radio node comprises an uplink grant for retransmission of data; and
a second of the two states indicates, by the NDI flag being toggled, that the transmission from the radio node comprises an uplink grant for new data.

20. The network node of claim 19, wherein the processor circuit is configured to generate the RRC signaling that indicates that HARQ information for the data transmission by the wireless communication device is conveyed on a PDCCH.

21. The network node of claim 19, wherein a radio node to which the data transmission by the wireless communication device is made is configured to perform a Listen Before Talk procedure when a carrier upon which the transmission from the radio node is to be transmitted must be occupied by the radio node before the transmission to the wireless communication device.

22. The network node of claim 19, wherein the processor circuit is configured to determine that HARQ information for the data transmission by the wireless communication device is to be conveyed on a PDCCH.

23. The network node of claim 22, wherein the processor circuit is configured to determine that the HARQ information is to be conveyed on the PDCCH based on statistics accumulated within the wireless communication network.

24. The network node of claim 22, wherein the processor circuit is configured to determine that the HARQ information is to be conveyed on the PDCCH based on interference conditions at the wireless communication device, the network node, and/or a radio node to which the data transmission by the wireless communication device is made.

* * * * *